US008006652B2

(12) United States Patent
Guinther et al.

(10) Patent No.: US 8,006,652 B2
(45) Date of Patent: Aug. 30, 2011

(54) EMISSIONS CONTROL SYSTEM FOR DIESEL FUEL COMBUSTION AFTER TREATMENT SYSTEM

(75) Inventors: Gregory H. Guinther, Richmond, VA (US); Joseph W. Roos, Mechanicsville, VA (US); David M. Human, Midlothian, VA (US); Scott D. Schwab, Richmond, VA (US)

(73) Assignee: Afton Chemical Intangibles LLC, Richmond, VA (US)

( * ) Notice: Subject to any disclaimer, the term of this patent is extended or adjusted under 35 U.S.C. 154(b) by 1045 days.

(21) Appl. No.: 11/072,872

(22) Filed: Mar. 4, 2005

(65) Prior Publication Data

US 2005/0193961 A1 Sep. 8, 2005

Related U.S. Application Data

(63) Continuation of application No. 10/272,598, filed on Oct. 16, 2002, now Pat. No. 6,971,337.

(51) Int. Cl.
*F02B 47/00* (2006.01)

(52) U.S. Cl. .............................. 123/1 A; 44/280; 60/297

(58) Field of Classification Search ................... 44/280, 44/300–459; 60/297, 311, 295, 282, 274; 123/1 A
See application file for complete search history.

(56) References Cited

U.S. PATENT DOCUMENTS

| 2,066,775 | A | * | 1/1937 | Fritsch ........................... 285/179 |
| 2,086,775 | A | | 7/1937 | Lyons et al. |
| 2,151,432 | A | | 3/1939 | Lyons et al. |
| 2,818,417 | A | | 12/1957 | Brown et al. |
| 3,348,932 | A | * | 10/1967 | Kukin ............................. 44/321 |
| 4,036,605 | A | | 7/1977 | Hartle |
| 4,104,036 | A | | 8/1978 | Chao et al. |
| 4,139,349 | A | | 2/1979 | Payne |
| 4,175,927 | A | | 11/1979 | Niebylski |
| 4,207,078 | A | * | 6/1980 | Sweeney et al. ................ 44/359 |
| 4,222,746 | A | * | 9/1980 | Sweeney et al. ................ 44/309 |
| 4,240,801 | A | * | 12/1980 | Desmond, Jr. .................. 44/326 |
| 4,266,946 | A | | 5/1981 | Niebylski |
| 4,317,657 | A | | 3/1982 | Niebylski |
| 4,390,345 | A | | 6/1983 | Somorjai |
| 4,474,580 | A | | 10/1984 | MacKenzie et al. |
| 4,510,265 | A | * | 4/1985 | Hartwig ....................... 502/330 |
| 4,568,357 | A | * | 2/1986 | Simon ............................ 44/364 |

(Continued)

FOREIGN PATENT DOCUMENTS

CA 2428726 12/2003

(Continued)

OTHER PUBLICATIONS

Faix, Louis J.; A study if the Effects of Manganese Fuel Additive on Automotive Emissions; SAE [Tech. Pap.], 780002, pp. 1-12.

(Continued)

*Primary Examiner* — Michael Cuff
*Assistant Examiner* — Hung Q Nguyen
(74) *Attorney, Agent, or Firm* — Thomas & Karceski, PC

(57) ABSTRACT

An emissions control system for the after treatment of a fuel combustion process exhaust stream includes an exhaust passageway. The exhaust passageway allows for passage of an exhaust stream containing exhaust byproducts from the combustion of a fuel that includes a manganese compound. The exhaust stream includes a manganese compound which complexes with at least one of the exhaust byproducts.

54 Claims, 3 Drawing Sheets

U.S. PATENT DOCUMENTS

| | | | |
|---|---|---|---|
| 4,588,416 A | | 5/1986 | Zaweski et al. |
| 4,641,496 A | * | 2/1987 | Wade .............................. 60/374 |
| 4,664,677 A | | 5/1987 | Dorer, Jr. et al. |
| 4,670,020 A | | 6/1987 | Rao |
| 4,674,447 A | | 6/1987 | Davis |
| 4,804,388 A | | 2/1989 | Kukin |
| 4,813,233 A | * | 3/1989 | Vergeer et al. .................. 60/286 |
| 4,816,038 A | | 3/1989 | Koch et al. |
| 4,891,050 A | | 1/1990 | Bowers et al. |
| 4,908,045 A | | 3/1990 | Farrar |
| 4,934,142 A | * | 6/1990 | Hayashi et al. ................. 60/297 |
| 4,946,609 A | | 8/1990 | Pruess et al. |
| 4,955,331 A | | 9/1990 | Hohr et al. |
| 5,034,020 A | | 7/1991 | Epperly et al. |
| 5,100,632 A | * | 3/1992 | Dettling et al. ............ 423/213.5 |
| 5,113,803 A | | 5/1992 | Hollran et al. |
| 5,123,243 A | * | 6/1992 | Baddour ........................ 60/274 |
| 5,340,369 A | | 8/1994 | Koch et al. |
| 5,376,154 A | * | 12/1994 | Daly et al. ...................... 44/358 |
| 5,501,714 A | | 3/1996 | Valentine et al. |
| 5,534,039 A | * | 7/1996 | Huang et al. ................... 44/367 |
| 5,551,957 A | | 9/1996 | Cunningham et al. |
| 5,575,823 A | * | 11/1996 | Wallace et al. ................. 44/359 |
| 5,584,894 A | | 12/1996 | Peter-Hoblyn et al. |
| 5,599,357 A | | 2/1997 | Leeper |
| 5,679,116 A | | 10/1997 | Cunningham et al. |
| 5,711,149 A | * | 1/1998 | Araki .............................. 60/278 |
| 5,732,548 A | | 3/1998 | Peter-Hoblyn |
| 5,758,496 A | * | 6/1998 | Rao et al. ........................ 60/295 |
| 5,809,774 A | | 9/1998 | Peter-Hoblyn et al. |
| 5,809,775 A | | 9/1998 | Tarabulski et al. |
| 5,813,224 A | | 9/1998 | Rao et al. |
| 5,819,529 A | | 10/1998 | Peter-Hoblyn |
| 5,912,190 A | | 6/1999 | Barr et al. |
| 5,919,276 A | | 7/1999 | Jeffrey |
| 5,924,280 A | | 7/1999 | Tarabulski |
| 5,928,392 A | | 7/1999 | Aradi |
| 5,944,858 A | * | 8/1999 | Wallace .......................... 44/359 |
| 5,953,906 A | | 9/1999 | Gamel et al. |
| 5,976,475 A | | 11/1999 | Peter-Hoblyn et al. |
| 6,003,303 A | | 12/1999 | Peter-Hoblyn et al. |
| 6,023,928 A | | 2/2000 | Peter-Hoblyn et al. |
| 6,051,040 A | | 4/2000 | Peter-Hoblyn |
| 6,056,792 A | | 5/2000 | Barr et al. |
| 6,152,972 A | | 11/2000 | Shustorovich et al. |
| 6,193,767 B1 | | 2/2001 | Arters et al. |
| 6,200,358 B1 | * | 3/2001 | Fleischer et al. ................ 44/300 |
| 6,361,754 B1 | | 3/2002 | Peter-Hoblyn et al. |
| 6,629,407 B2 | * | 10/2003 | Roos et al. ...................... 60/274 |
| 2002/0112466 A1 | | 8/2002 | Roos et al. |

FOREIGN PATENT DOCUMENTS

| | | |
|---|---|---|
| CA | 2438159 | 4/2004 |
| CN | 1069998 A | 3/1993 |
| EP | 0 507 510 A1 | 10/1992 |
| EP | 0 466 512 B1 | 6/1994 |
| EP | 0 667 387 A2 | 8/1995 |
| EP | 0668 899 B1 | 9/2000 |
| EP | 1-215 272 A1 | 6/2002 |
| WO | WO 97/28358 A1 | 8/1997 |

OTHER PUBLICATIONS

Fekete, Nicholas; Gruden, Igor; Vogtlander, Dirk; Nester, Ulrich; Krutzsch, Bernd; Willand, Jurgen; and Kuhn, Michael; Advanced Engine Control and Exhaust Gas Aftertreatment of a Leanburn SI Engine; SAE [Tech. Pap] 972873; pp. 1-10.

Clean Diesel Technologies Inc. Announces Test Results of Platinum/Cerium Diesel Fuel Additive; James M. Valentine, 203/327-7050, Sep. 20, 2002, pp. 1-2.

Eastwood, Peter; Critical Topics in Exhaust Gas Aftertreatment; Research Studies Press Ltd. (2000), pp. 215-218.

Lenane, D. L.; Effect of MMT on Emissions from Production Cars; SAE [Tech. Pap.], 780003, pp. 1-20.

Lenane, D. L.; Effect of a Fuel Additive on Emission Control Systems; sae [Tech. Pap.] 902097, pp. 1-17.

Farrauto, Robert J.; Mooney, John J.; Effects of Sulfur on Performance of Catalytic Aftertreatment Devices; SAE [Tech. Pap.] 920557, pp. 1-7.

Jelles, S.J.; Mediae, M.; Moulijn, J.A.; Acres, G.J.K.; and Peter-Hoblyn, J.D., Diesel Particulate Control, Application of an Activated Particulate Trap in Combination with Fuel Additives at an Ultra Low Dose Rate; SAE [Tech. Pap.], 1999-01-0113, pp. 1-6.

Eolys™ Fuel-Bome Catalyst for Diesel Particulates Abatement: A Key Component of an Integrated System, DieselNet Technical Report, Sep. 1999, pp. 1-9.

Guyon. M.; Blejean, F.; Bert, C.; LeFaou, PH.; Impact of Sulfur on Nox Trap Catalyst Activity—Study of the Regeneration Conditions; SAE [Tech. Pap.] 982607, pp. 87-95.

Arakawa, Kenji; Matsuda, Satoshi; and Kinoshita, Hiroo; Progress in Sulfur Poisoning Resistance of Lean NOx Catalysts; SAE [Tech Pap.] 980930, pp. 111-118.

Dearth, Mark A.; Hepburn, Jeffrey S.; Thanasiu, Eva; McKenzie, JoAnne; Home, Scott G.; Sulfur Interaction with Lean Nox Traps: Laboratory end Engine Dynamometer Studies; SAE [Tech. Pap.] 982595, 1998, pp. 1-9.

Aradi, Allen A.; Roos, Joeseph W.; Fort, Jr.. Ben F.; Lee, Thomas E.; and Davidson, Robert I.; The Physical and Chemical Effect of Manganese Oxides on Automobile Catalytic Converters; SAE [Tech. Pap.] 940747, pp. 207-218.

Bailie. J. D.; Michalski, G. W.; Unzelman, G. H., MMT—A Versatile Antiknock; Natl. Pet. Refiners Assoc., [Tech. Pap.], AM-78-38, pp. 1-20.

Valentine, James M.; Peter-Hoblyn, Jeremy D.; and Acres, G.K, Emissions Reduction and Improved Fuel Economy Performance from a Bimetallic Platinum/Cerium Diesel Fuel Additive at Ultra-Low Dose Rates; SAE [Tech. Pap], 2000-01-1934, pp. 1-9.

Guinther, Greg H.; Human, David M.; Miller. Keith T.; Roos, Joseph W.; and Schwab, Scott D. The Role that Methylcyclopentadienyl Manganese Tricarbonyl (MMT®) Can Play in Improving Low-Temperature Performance of Diesel Particulate Traps; SAE [Tech. Pap.], 2002-01-2728, pp. 1-9.

Nelson, A.J.; Ferreira, J.L.; Reynolds, J.G.; Schwab, S.D.; and Roos, J.W.; X-Ray Absorption Characterization of Diesel Exhaust Particulates; Article in Materials Research Society Symposium Proceedings, vol. 590, 2000, pp. 63-69.

* cited by examiner

EMISSIONS CONTROL SYSTEM FOR DIESEL FUEL COMBUSTION AFTER TREATMENT SYSTEM

This application is a continuation of U.S. patent application Ser. No. 10/272,598, filed on Oct. 16, 2002 now U.S. Pat. No. 6,971,337. That application is incorporated herein in its entirety.

FIELD OF THE INVENTION

The present invention relates to the use of a fuel additive for protecting and improving operation of combustion exhaust after treatment systems. The additive contains one or more manganese compounds. The additive can be introduced into a combustion chamber as part of the fuel, or it may be injected alone or with the fuel into the combustion exhaust. The additive will then enhance the operation of after treatment systems including, for example, those that incorporate catalyzed and continuously regenerating technology diesel particulate filters.

DESCRIPTION OF THE PRIOR ART

It is well known in the automobile industry, or any industry where hydrocarbonaceous fuels are burned, to reduce tailpipe (or smokestack) emissions by using various strategies. For example, the most common method for reducing emissions from spark ignition engines is by careful control of the air-fuel ratio and ignition timing. Retarding ignition timing from the best efficiency setting reduces HC and $NO_x$ emissions, while excessive retard of ignition increases the output of CO and HC. Increasing engine speed reduces HC emissions, but $NO_x$ emissions increase with load. Increasing coolant temperature tends to reduce HC emissions, but this results in an increase in $NO_x$ emissions.

It is also known that treating the effluent stream from a combustion process by exhaust after treatment can lower emissions. The effluent contains a wide variety of chemical species and compounds, some of which may be converted by a catalyst into other compounds or species. For example, it is known to provide exhaust after treatment using a three-way catalyst and a lean $NO_x$ trap. Other catalytic and non-catalytic methods are also known.

Thermal reactors are noncatalytic devices which rely on homogeneous bulk gas reactions to oxidize CO and HC. However, in thermal reactors, $NO_x$ is largely unaffected. Reactions are enhanced by increasing exhaust temperature (e.g. by a reduced compression ratio or retarded timing) or by increasing exhaust combustibles (rich mixtures). Typically, temperatures of 1500° F. (800° C.) or more are required for peak efficiency. Usually, the engine is run rich to give 1 percent CO and air is injected into the exhaust. Thermal reactors are seldom used, as the required setting dramatically reduces fuel efficiency.

Catalytic systems are capable of reducing $NO_x$ as well as oxidizing CO and HC. However, a reducing environment for $NO_x$ treatment is required which necessitates a richer than chemically correct engine air-fuel ratio. A two-bed converter may be used in which air is injected into the second stage to oxidize CO and HC. While efficient, this procedure results in lower fuel economy.

Single stage, three way catalysts (TWC's) are widely used, but they require extremely precise fuel control to be effective. Only in the close proximity of the stoichiometric ratio is the efficiency high for all three pollutants, excursions to either side of stoichiometric can cause increases in hydrocarbon and carbon monoxide or $NO_x$ emissions. Such TWC systems can employ, for example, either a zirconia or titanium oxide exhaust oxygen sensor or other type of exhaust sensor and a feedback electronic controls system to maintain the required air-fuel ratio near stoichiometric.

Catalyst support beds may be pellet or honeycomb (e.g. monolithic). Suitable reducing materials include ruthenium and rhodium, while oxidizing materials include cerium, platinum and palladium.

Diesel systems raise a different set of challenges for emissions control. Strategies for reducing particulate and HC include optimizing fuel injection and air motion, effective fuel atomization at varying loads, control of timing of fuel injection, minimization of parasitic losses in combustion chambers, low sac volume or valve cover orifice nozzles for direct injection, reducing lubrication oil contributions, and rapid engine warm-up.

In terms of after treatment, it is known that diesel engines generally burn lean and the exhaust will therefore usually contain excess oxygen. Thus, $NO_x$ reduction with conventional three-way catalysts is not feasible. $NO_x$ is removed from diesel exhaust by either selective catalytic reduction, the use of lean $NO_x$ catalysts such as those comprised of zeolitic catalysts or using metals such as iridium, or catalyzed thermal decomposition of NO into $O_2$ and $N_2$.

Diesel particulate traps such as catalyzed diesel particulate filters (C-DPFs) and continuously regenerating technology diesel particulate filters (CRT-DPFs) have been developed which employ ceramic or metal filters. Thermal and catalytic regeneration can burn out the material stored. New particulate standards currently under review may necessitate such traps. Fuel composition, including sulfur and aromatic content, and the burning of lubricant can contribute to increased particulate emissions. Catalysts have been developed for diesels which are very effective in oxidizing the organic portion of the particulate.

Improved fuel economy can be obtained by using a lean-burn gasoline engine, for example, a direct injection gasoline engine, however currently $NO_x$ cannot be reduced effectively from oxidizing exhaust using a typical three-way catalyst because the high levels of oxygen suppress the necessary reducing reactions. Without a $NO_x$ adsorber or lean $NO_x$ trap (LNT), the superior fuel economy of the lean-burn gasoline engine cannot be exploited. The function of the LNT is to scavenge the $NO_x$ from the exhaust, retaining it for reduction at some later time. Periodically, the LNT must be regenerated by reducing the NOx. This can be accomplished by operating the engine under rich air-fuel ratios for the purpose of purging the trap. This change in operating conditions can adversely effect fuel economy as well as driveability. These LNT's may also be placed on diesel engines, which also operate in a lean air-fuel mode. As in the lean-burn gasoline engines, the exhaust of both types of engines is net oxidizing and therefore is not conducive to the reducing reactions necessary to remove NOx. It is an object of the present invention to improve the storage efficiency and durability of the LNT and to prolong the useful life of the LNT before regeneration is necessary.

It is well known that $NO_x$ adsorbers are highly vulnerable to deactivation by sulfur (see, for example, M. Guyon et al., *Impact of Sulfur on $NO_x$ Trap Catalyst Activity-Study of the Regeneration Conditions*, SAE Paper No. 982607 (1998); and P. Eastwood, *Critical Topics in Exhaust Gas Aftertreatment*, Research Studies Press Ltd. (2000) pp. 215-218.) and other products resulting from fuel combustion and normal lubricant consumption. It is an object of the present invention to provide fuel or lubricant compositions capable of reducing the adverse impact of sulfur, and other exhaust byproducts, on the emissions system including $NO_x$ adsorbers and LNTs.

Performance fuels for varied applications and engine requirements are known for controlling combustion chamber and intake valve deposits, cleaning port fuel injectors and carburetors, protecting against wear and oxidation, improving lubricity and emissions performance, and ensuring storage stability and cold weather flow. Fuel detergents, dispersants, corrosion inhibitors, stabilizers, oxidation preventers, and performance additives are known to increase desirable properties of fuels.

Organometallic manganese compounds, for example methylcyclopentadienyl manganese tricarbonyl (MMT®), available from Ethyl Corporation of Richmond, Va., are known for use in gasoline as both emissions-reducing agents and as antiknock agent (see, e.g. U.S. Pat. No. 2,818,417). These manganese compounds have been used to lower deposit formation in fuel induction systems (U.S. Pat. Nos. 5,551,957 and 5,679,116), sparkplugs (U.S. Pat. No. 4,674,447) and in exhaust systems (U.S. Pat. Nos. 4,175,927; 4,266,946; 4,317,657, and 4,390,345). Organometallic iron compounds, such as ferrocene, are known as well for octane enhancement (U.S. Pat. No. 4,139,349).

Organometallics for example compounds of Ce, Pt, Mn or Fe among others have been added to fuel to enhance the ability of particulate traps to regenerate or to directly reduce the emissions of particulate from diesel or compression ignition type engines or other combustion systems. These additives function through the action of the metal particles that are the product of additive breakdown on the particulate matter during combustion or in the exhaust or particulate trap.

SUMMARY OF THE INVENTION

Accordingly, it is an object of the present invention to overcome the limitations and drawbacks of the foregoing systems and methods to provide methods for using a composition to protect and improve the operation of combustion exhaust after treatment systems.

In one embodiment, a method of enhancing the operation of an emission after treatment system in a diesel fuel combustion system includes supplying a diesel fuel comprising an additive that includes a manganese compound to a diesel fuel combustion system. The combustion system comprises a catalyzed or, alternatively, continuously regenerating technology diesel particulate filter. The fuel is then combusted in the combustion chamber to produce at least one byproduct comprising the manganese compound. The manganese is in an effective amount to complex with the at least one combustion byproduct. The manganese compound or manganese ion may be an inorganic metal compound or an organometallic compound. The inorganic metal compound can be selected from the group consisting of fluorides, chlorides, bromides, iodides, oxides, nitrates, sulfates, phosphates, carbonates, hydrides, hydroxides, nitrides, and mixtures thereof. The organometallic compound is selected from the group consisting of alcohols, aldehydes, ketones, esters, anhydrides, sulfonates, phosphonates, chelates, phenates, crown ethers, carboxylic acids, amides, acetyl acetonates, and mixtures thereof. A preferred organometallic compound is manganese methylcyclopentadienyl tricarbonyl.

In a still further embodiment, a method of enhancing the operation of an emissions after treatment system in a diesel fuel combustion system comprises supplying a diesel fuel to a diesel fuel combustion system. The combustion system may comprise a catalyzed diesel particulate filter or a continuously regenerating technology diesel particulate filter. The fuel is combusted in a combustion system to produce at least one combustion byproduct in an exhaust stream. An additive comprising a manganese compound is injected into the exhaust stream. The manganese compound complexes with at least one combustion byproduct. The manganese compound which can be an inorganic or organometallic compound is supplied in an effective amount to complex with the at least one combustion byproduct. The inorganic metal compound or organometallic compound may be as noted earlier herein.

In a still further embodiment, an emissions control system for the after treatment of a diesel fuel combustion process exhaust stream comprises an exhaust passageway. The exhaust passageway allows for passage of an exhaust stream containing exhaust byproducts from the combustion of a diesel fuel comprising a manganese compound. This system also includes a catalyzed or continuously regenerating technology diesel particulate filter located within the exhaust passageway and adapted to contact the exhaust stream. The exhaust stream comprises a manganese compound which complexes with at least one of the exhaust byproducts. The alternatives of possible manganese compounds include those noted herein.

In a still further embodiment, an emission control system for the after treatment of a diesel fuel combustion process exhaust stream includes an exhaust passageway. The exhaust passageway for the passage of an exhaust stream contains exhaust byproducts from the combustion of a diesel fuel. A catalyzed or continuously regenerating technology diesel particulate filter is located within the exhaust passageway and is adapted to contact the exhaust stream. The exhaust stream has an additive introduced into it, the additive comprising a manganese compound which complexes with at least one of the exhaust byproducts. The alternatives of possible manganese compounds include those noted herein.

In a still further embodiment, a method of enhancing the operation of an emission after treatment system in a combustion system includes supplying a fuel comprising an additive that includes a manganese compound to a fuel combustion system. The fuel is then combusted in the combustion chamber to produce at least one byproduct comprising the manganese compound. The manganese is in an effective amount to complex with the at least one combustion byproduct.

In a still further embodiment, a method of enhancing the operation of an emissions after treatment system in a combustion system comprises supplying a fuel to a combustion system. The fuel is combusted in a combustion system to produce at least one combustion byproduct in an exhaust stream. An additive comprising a manganese compound is injected into the exhaust stream. The manganese compound complexes with at least one combustion by product.

DETAILED DESCRIPTION

Figure 1:
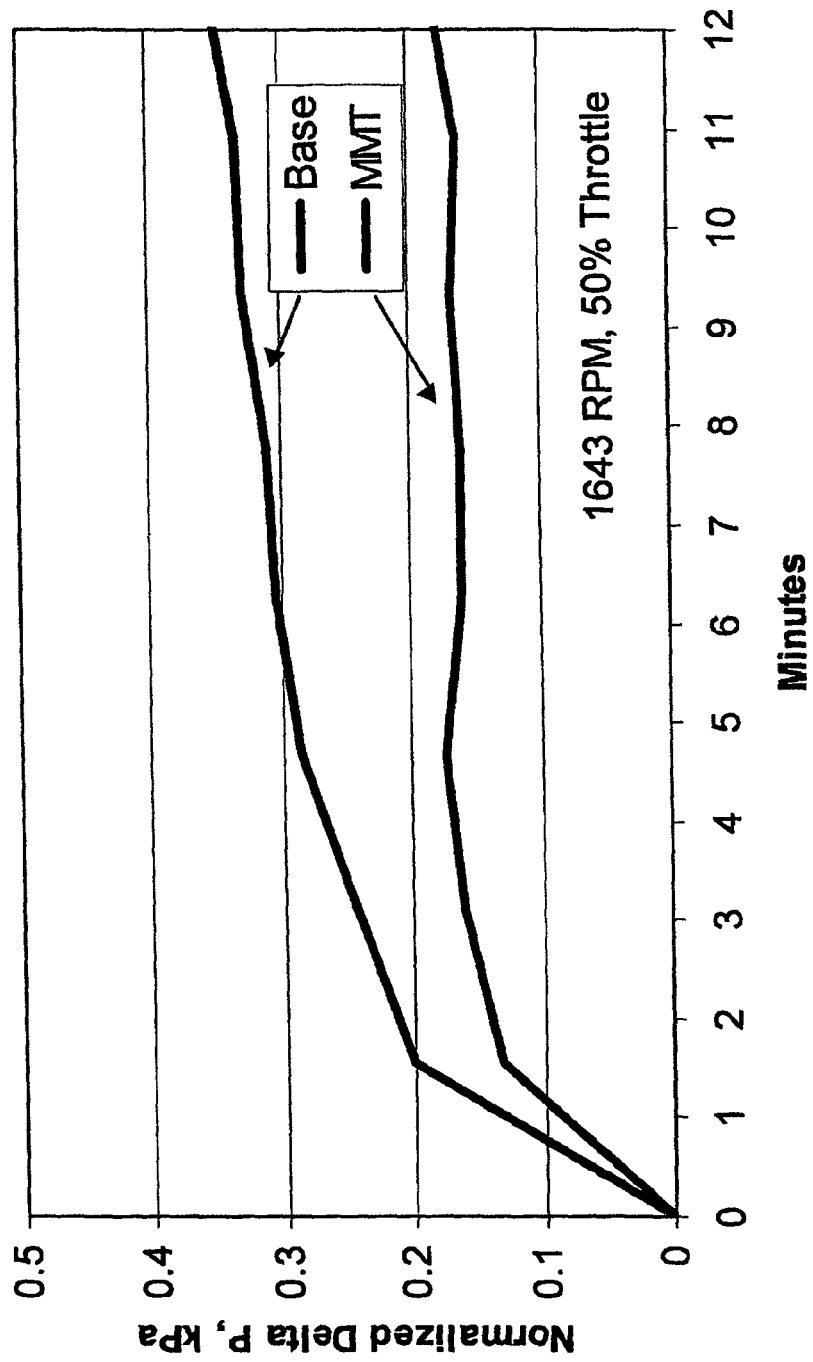
FIGS. 1 and 2 are profiles of exhaust gas backpressure during base and additized fuel soot loading tests.

The additives used in the methods and systems of the present invention are inorganic or organometallic manganese containing compounds soluble in fuels. This fuel is then combusted in a combustion system that includes an after treatment system. It protects the after treatment system from harmful combustion byproducts that could otherwise neutralize their effectiveness. The manganese in the additive also promotes the oxidation of carbon particulate matter. Upon introduction into the exhaust stream, the manganese comes into contact with the carbon fraction of the particulate, accelerates carbon oxidation reactions, and aids in after treatment system regeneration. The manganese compound also reduces the rate of soot accumulation. The exhaust system may also contain other after treatment systems.

The hydrocarbonaceous fuel combustion systems that may benefit from the present invention include all combustion engines that burn fuels. By "combustion system" herein is meant any and all internal and external combustion devices, machines, engines, turbine engines, boilers, incinerators, evaporative burners, stationary burners and the like which can combust or in which can be combusted a fuel. Fuels suitable for use in the operation of combustion systems of the present invention include diesel fuel, jet fuel, kerosene, synthetic fuels, such as Fischer-Tropsch fuels, liquid petroleum gas, fuels derived from coal, natural gas, propane, butane, unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. Oxygenates suitable for use in the present invention include methanol, ethanol, isopropanol, t-butanol, mixed $C_1$ to $C_5$ alcohols, methyl tertiary butyl ether, tertiary amyl methyl ether, ethyl tertiary butyl ether and mixed ethers. Oxygenates, when used, will normally be present in the base fuel in an amount below about 25% by volume, and preferably in an amount that provides an oxygen content in the overall fuel in the range of about 0.5 to about 5 percent by volume. Other fuels that are useful in the methods and devices of the present invention are gasoline, bunker fuel, coal dust, crude oil, refinery "bottoms" and by-products, crude oil extracts, hazardous wastes, yard trimmings and waste, wood chips and saw dust, agricultural waste or tillage, plastics and other organic waste and/or by-products, and mixtures thereof, and emulsions, suspensions, and dispersions thereof in water, alcohol, or other carrier fluids. By "diesel fuel" herein is meant one or more fuels selected from the group consisting of diesel fuel, biodiesel, biodiesel-derived fuel, synthetic diesel and mixtures thereof and other products meeting the definitions of ASTM D975. It is preferred that the sulfur content of the diesel fuel be less than 100 ppm, and especially preferred that the sulfur content be less than 30 ppm. Fuels having relatively high sulfur content, while within the scope of the present invention, are currently impractical for use with catalytically enhanced after treatment systems.

Conventional combustion systems useful with the present invention will typically include some degree of emission control or after treatment system. In all cases of combustion, the emission treatment may include a catalytic system to reduce harmful emissions. Of course, other emission treatment systems are well known. Unfortunately, many of such emission systems have a tendency to lose their effectiveness over time due to poisoning or degradation of emission treatment system components.

The present invention contemplates providing a manganese compound to an additive, to a fuel composition or, alternatively, directly into the exhaust stream or combustion zone resulting from the combustion process, whereby the operation of the emission treatment system components will be significantly enhanced. A copending application discloses various delivery and combination opportunities when using an aqueous, water soluble, manganese containing additive. U.S. patent application Ser. No. 10/165,462, filed Jun. 7, 2002.

The preferred metal herein includes elemental and ionic manganese, precursors thereof, and mixtures of metal compounds including manganese. These manganese compounds may be either inorganic or organic. Also effective in the present invention is the generation, liberation or production in situ of manganese or manganese ions.

Preferred inorganic metallic compounds in an embodiment of the present invention can include by example and without limitation fluorides, chlorides, bromides, iodides, oxides, nitrates, sulfates, phosphates, nitrides, hydrides, hydroxides, carbonates and mixtures thereof. Manganese sulfates and phosphates will be operative in the present invention and may, in certain fuels and combustion applications, not present unacceptable additional sulfur and phosphorus combustion byproducts. Preferred organometallic compounds in an embodiment of the present invention include alcohols, aldehydes, ketones, esters, anhydrides, sulfonates, phosphonates, chelates, phenates, crown ethers, carboxylic acids, amides, acetyl acetonates, and mixtures thereof.

Especially preferred manganese containing organometallic compounds are manganese tricarbonyl compounds. Such compounds are taught, for example, in U.S. Pat. Nos. 4,568,357; 4,674,447; 5,113,803; 5,599,357; 5,944,858 and European Patent No. 466 512 B1.

Suitable manganese tricarbonyl compounds which can be used in the practice of this invention include cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and the like, including mixtures of two or more such compounds. Preferred are the cyclopentadienyl manganese tricarbonyls which are liquid at room temperature such as methylcyclopentadienyl manganese tricarbonyl, ethylcyclopentadienyl manganese tricarbonyl, liquid mixtures of cyclopentadienyl manganese tricarbonyl and methylcyclopentadienyl manganese tricarbonyl, mixtures of methylcyclopentadienyl manganese tricarbonyl and ethylcyclopentadienyl manganese tricarbonyl, etc.

Preparation of Such Compounds is Described in the literature, for example, U.S. Pat. No. 2,818,417, the disclosure of which is incorporated herein in its entirety.

When formulating additives to be used in the methods and systems of the present invention, the manganese compounds are employed in amounts sufficient to reduce the impact of poisons, e.g., sulfur, lead, zinc, soot and phosphorus, on the after treatment systems, reduce the rate of soot accumulation, reduce the temperature at which the soot oxidizes, and otherwise generally enhance the operation of after treatment systems including, for instance, a catalyzed diesel particulate filter, or alternatively, a continuously regenerating technology diesel particulate filter.

Manganese compounds are believed to bind with poisons in the exhaust stream to prevent those poisons from binding or depositing on an after treatment system such as the catalytic surface of the diesel particulate filter. See, e.g., A. J. Nelson, J. L. Ferreira, J. G. Reynolds, J. W. Roos and S. D. Schwab, "X-Ray Absorption Characterization of Diesel Exhaust Particulates," Applications of Synchrotron Radiation Techniques to Materials Science V, Materials Research Society Conference Proceedings, No. 590, 63 (2000). For instance, manganese sulfates and phosphates may be formed and are trapped within a filter. These manganese sulfates and phosphates do not form a glaze over or otherwise tie up catalytic sites in a filter. This mechanism is distinguished from other additives such as platinum. Platinum compounds do not bond or otherwise complex with poisons such as sulfates and phosphates. Instead, it is hypothesized in the literature that platinum compounds in an additive act to replace or substitute as the catalyst on the surface of the filter. It is basic chemical differences such as those described herein that distinguish manganese from other metals like platinum. In formulating additives for use in the present invention, therefore, it is important that effective amounts of manganese be employed, and further that any other metal compounds that can be additionally incorporated must not have any negative effects on the manganese mechanisms.

The amount or concentration of the additive may be selected based on the concentration of sulfur in the diesel fuel. A preferred treatment rate of the manganese compound can be in excess of 100 mg of manganese/liter, more preferably up to about 50 mg/liter, and most preferably about 1 to about 30 mg/liter.

The term "after treatment system" is used throughout this application to mean any system, device, method, or combination thereof that acts on the exhaust stream or emissions resulting from the combustion of a diesel fuel. "After treatment systems" include all types of diesel particulate filters—catalyzed and uncatalyzed, lean $NO_x$ traps and catalysts, select catalyst reduction systems, $SO_x$ traps, diesel oxidation catalysts, mufflers, $NO_x$ sensors, oxygen sensors, temperature sensors, backpressure sensors, soot or particulate sensors, state of the exhaust monitors and sensors, and any other types of related systems and methods.

There are multiple types of diesel particulate filters (DPFs). Conventional, uncatalyzed DPFs are a well-known technology that has been used for many years. In operation, combustion byproducts such as particulates and soot are trapped and then oxidized, or "burned off". "Catalyzed diesel particulate filters" (C-DPFs) are filters incorporating a catalyst on or within the filter substrate that are adapted to reduce the oxidation temperature of the combustion byproducts captured in the filter. C-DPFs currently include cordierite or silicon carbide monolithic type filters. A "continuously regenerating technology diesel particulate filter" (CRT-DPF) is a system where the catalyst is a separate, flow-through substrate that precedes the diesel particulate filter in the exhaust passageway.

Diesel fuels, when combusted in engines operating under the diesel cycle, emit unburned soot particles into the exhaust gas stream. Because the oxidation temperature of soot is in excess of 500° C., it is desirable to employ catalysts either within or preceding the filters to lower the soot oxidation temperature. A catalyst that is part of the filter substrate, i.e., a catalyzed diesel particulate filter, or C-DPF, requires an exhaust temperature between 325 and 400° C. to initiate filter regeneration. Regeneration is the oxidation of accumulated soot. In this system, the soot accumulates on the catalytic sites within the filter substrate and the combination of temperature, pressure and the presence of the catalyst lower the temperature required for regeneration. In a continuously regenerating technology diesel particulate filter, soot oxidation temperature is reduced because the catalyst oxidizes NO in the exhaust gas to $NO_2$. The increased level of $NO_2$ promotes an increased level of soot oxidation within the filter.

The terms "complex" or "complexing" are intended herein to describe the combination of or reaction by the manganese containing compound with the combustion byproduct(s) such as poisons, soot and other particulates. The combination includes covalent or ionic reactions or any other binding of the metal compound with the combustion byproduct. Further, the term "combustion byproduct" includes, but is not limited to, particulates, soot, unburned soot, uncombusted hydrocarbons, partially-combusted hydrocarbons, combusted hydrocarbons, oxides of nitrogen, and any other gas, vapor, particle or compound that results from the combustion of a fuel.

Reference is also made throughout of the term "enhanced" in the context of operation of an emissions after treatment system. The term "enhanced" means an improvement in the operation of an after treatment system relative to the operation of a similar system that does not have a manganese compound combusted or injected or otherwise streamed through it. "Enhanced" operation includes, but is not limited to, reduction in the impact of poisons on the emissions control system, reduction in the rate of soot accumulation, and reduction in the temperature at which the soot is oxidized in the filter.

When the emissions system contains a component which is poisonable by combustion byproducts (such as those containing sulfur, phosphorus, lead, zinc or soot), for instance, a barium-containing lean $NO_x$ trap, the present invention provides novel methods for providing a substance which competes with the active site (e.g., barium) in the lean-burning exhaust. As long as the manganese containing compound of the additive will compete with the metal of the catalyst system for complexing with the potential emissions system poisons (e.g., sulfur) the manganese may be suitable for use as scavenging agents. Further, the manganese scavengers of the present invention can reduce the detrimental impact of other poisons such as sulfur, phosphorus, lead, zinc, or soot on emissions control systems of the lean burn combustion systems in one embodiment of the present invention.

In this invention, when the manganese containing, fuel-borne catalyst was used in combination with the CRT-DPF, there was an unanticipated benefit. There is a lower soot accumulation rate within the CRT-DPF and the regeneration temperature is reduced below the regeneration temperature observed with either the fuel-borne catalyst or CRT-DPF alone.

Example 1

Figure 2:
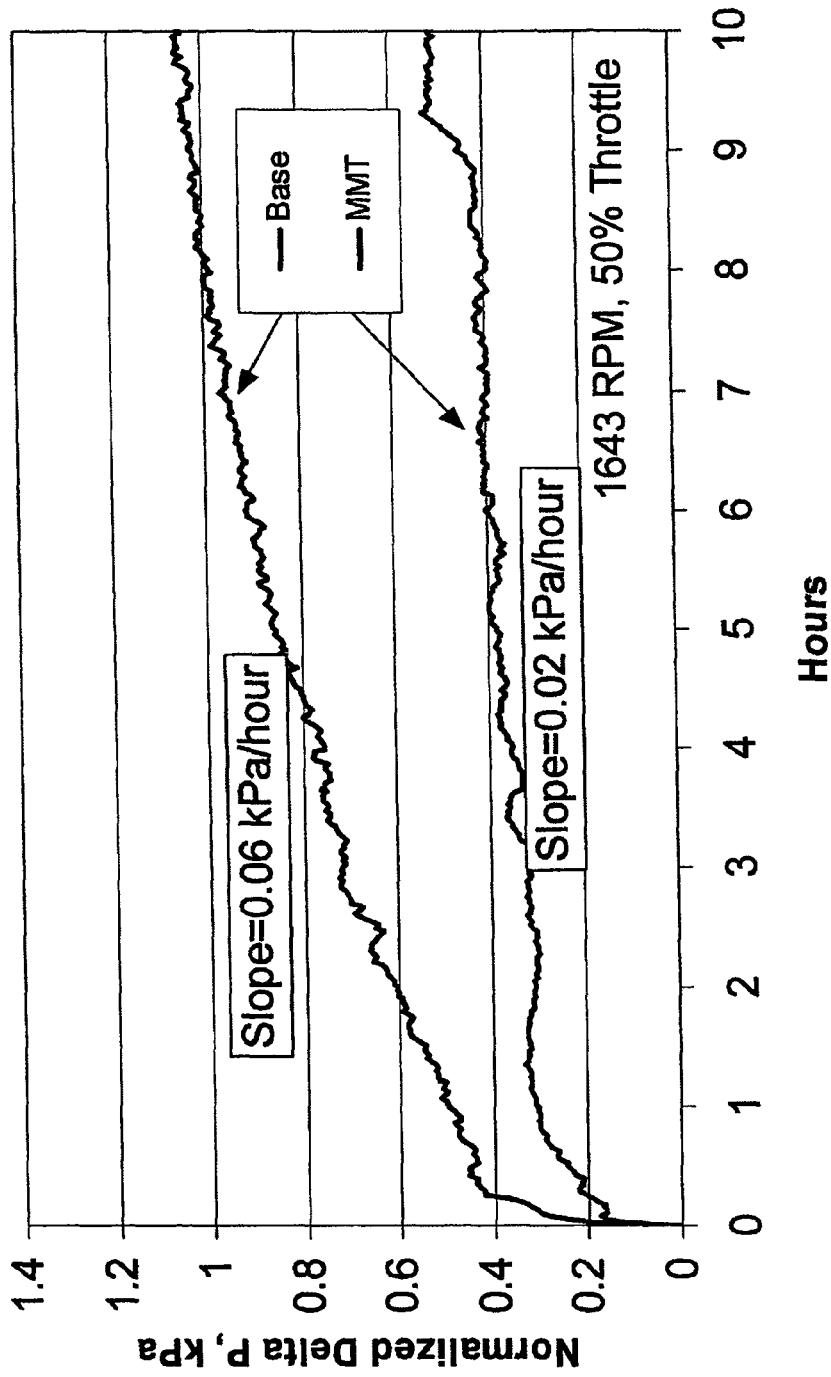

The additives useful herein are organometallic, manganese containing compounds soluble or dispersible in diesel fuel. The manganese promotes the oxidation of carbon particulate matter. The exhaust gas after treatment device is a continuously regenerating technology diesel particulate filter (CRT-DPF). Upon introduction of the fuel into the combustion chamber or exhaust stream, the manganese is released and combines or complexes with the carbon fraction of the particulate matter, accelerating the oxidation reactions that take place prior to and during accumulation within the CRT-DPF. The measure of soot loading within a filter is the increase in exhaust gas backpressure (EGBP). A comparison of EGBP profiles during base and additized fuel soot loading tests are shown in FIGS. 1 and 2. FIG. 1 displays the initial soot accumulation profile prior to catalyst light-off, and shows that use of the additized fuel leads to an immediate benefit of reduced EGBP. The continuation of this benefit through 10 hours is displayed in FIG. 2. The soot accumulation rate for base fuel, as measured by EGBP increase, is 0.06 kPa per hour. When additized fuel is tested, the rate is reduced by a factor of three to 0.02 kPa per hour. More details regarding this testing described herein is contained in SAE Paper No. 2002-01-2728, "The Role That Methylcyclopentodienyl Manganese Tricarbonyl (MMT) Can Play in Improving Low-Temperature Performance of Diesel Particulate Filters" which is incorporated herein in its entirety.

The base fuel used in this example was an ultra-low sulfur diesel fuel obtained from Phillips. This fuel had a nominal sulfur level of 3 ppm. The additive was provided so that the additized fuel had 20 mgMn/liter. The additive used was MMT® (Ethyl Corporation).

Figure 3:
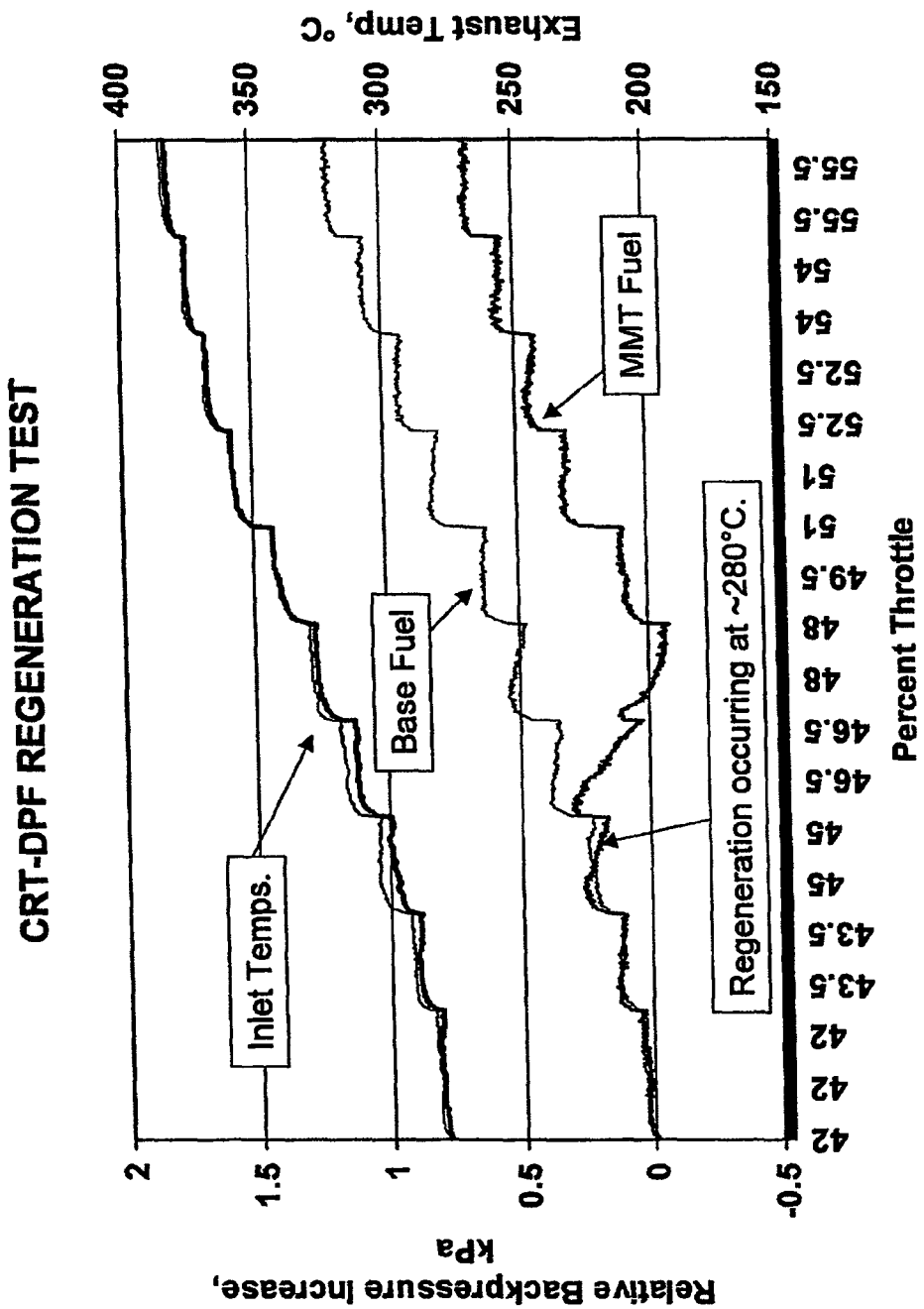
FIG. 3 is an exhaust gas backpressure profile of a regeneration test when base fuels and additized fuels are burned.

After filters are loaded with soot, it is useful to examine the temperature where regeneration (the burning-off of accumulated soot) will occur. FIG. 3 shows the results of regeneration tests when base fuels and additized fuels are burned. With unadditized fuel, filter regeneration was not observed at temperatures exceeding 380° C. With additized fuel, regeneration begins when exhaust temperature exceeds approximately 280° C. The accumulated carbon within the filter combusts, leading to complete filter regeneration. Notably, once the soot is burned off, the engine backpressure remains below that amount of backpressure seen with the unadditized fuel. In other words, not only does the soot burn off at a lower temperature with the additized fuel, the backpressure remains lower than with unadditized fuel as shown in FIG. 3.

Example 2

The exhaust gas after treatment device is a catalyzed diesel particulate filter (C-DPF). Upon introduction of the additized fuel into the combustion chamber or exhaust stream, the manganese is released and combines with the carbon fraction of the particulate matter, accelerating the oxidation reactions that take place prior to and during accumulation within the C-DPF. Because the rate of soot accumulation is lower and the soot contains a catalyst metal, the regeneration temperature is reduced relative to what would be expected with the C-DPF and unadditized fuel.

Example 3

In the applications described in Examples 1 and 2, the manganese used will form stable metal complexes including manganese phosphates. A portion of the manganese released into the combustion chamber or exhaust interacts with lubricant-derived phosphorus to form the stable metal phosphates as solid particulate and this reduces or prevents phosphorus deposition on the catalyst metal employed in the CRT-DPF, or the C-DPF. The use of these manganese containing fuel additives will protect the catalyst from deterioration resulting from phosphorus poisoning.

Example 4

In the applications described in Examples 1 and 2, the manganese additive used is one that will also form stable metal sulfates. The CRT-DPF or C-DPF is followed by a lean-$NO_x$ storage device that is sensitive to sulfur poisoning. A portion of the metal released into the combustion chamber or exhaust interacts with either fuel or lubricant-derived sulfur to form stable manganese sulfates, thereby scavenging the $SO_2$ and $SO_3$ and reducing or preventing deposition of sulfur species on the lean-$NO_x$ storage device.

Example 5

The manganese containing additives of the present invention enhance operation of an after treatment system by reducing the sintering of combustion byproduct metal on the surface of the DPF. The sintering of combustion byproduct metals may cover and render ineffective catalyst sites on the surface of the catalyzed DPF. "Sintering" is the fusion of combustion byproduct particles on the filter surfaces as a result of the heat in that filter. The manganese containing additive reduces the amount of sintering on the filter surfaces, as compared to the amount of sintering when unadditized fuel is burned, and therefore increases the effective life of the filter. It also makes the filter easier to clean because of the reduced sintering of the byproducts to the walls of the filter.

Example 6

The manganese containing additives of the present invention enhance operation of an after treatment system by accelerating ash buildup in a DPF but nevertheless reducing rate of backpressure increase. The manganese binds with combustion byproducts, e.g., sulfur and phosphorous oxides, and forms stable manganese compounds that are then trapped as and with the ash in the filter. Surprisingly, it has been discovered that this literal increase in ash does not increase backpressure. Further, by using a manganese containing additive, the DPF will need to be cleaned less often and the ash can be more completely removed when it is cleaned.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as formation of the organometallic compound) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations or immediately thereafter is thus wholly immaterial for an accurate understanding and appreciation of this disclosure and the claims thereof.

At numerous places throughout this specification, reference has been made to a number of U.S. Patents, published foreign patent applications and published technical papers. All such cited documents are expressly incorporated in full into this disclosure as if fully set forth herein.

This invention is susceptible to considerable variation in its practice. Therefore the foregoing description is not intended to limit, and should not be construed as limiting, the invention to the particular exemplifications presented hereinabove.

Rather, what is intended to be covered is as set forth in the ensuing claims and the equivalents thereof permitted as a matter of law.

Patentee does not intend to dedicate any disclosed embodiments to the public, and to the extent any disclosed modifications or alterations may not literally fall within the scope of the claims, they are considered to be part of the invention under the doctrine of equivalents.

What is claimed is:

1. An emissions control system including the treatment of a diesel fuel combustion process exhaust stream, comprising:
    an exhaust passageway,
    an exhaust stream in the exhaust passageway, the exhaust stream containing exhaust byproducts from the combustion of a diesel fuel and also comprising a manganese compound comprising about 1 to about 30 mg Mn/liter of fuel,
    a catalyzed diesel particulate filter located within the exhaust passageway, the catalyzed diesel particulate filter contacting the exhaust stream, the exhaust stream comprising the manganese compound, the manganese compound complexing with at least one of the exhaust byproducts in the exhaust stream, the operation of the catalyzed diesel particulate filter enhanced by the manganese compound complexing with at least one of the exhaust byproducts in the exhaust stream, and
    the exhaust stream being free of a platinum group metal selected from the group consisting of platinum, palladium, rhodium, ruthenium, osmium, and iridium.

2. An emissions control system as described in claim 1, wherein the diesel fuel is selected from the group consisting of biodiesel, biodiesel-derived fuel, and synthetic diesel fuel.

3. An emissions control system as described in claim 1, wherein the diesel fuel contains less than 30 ppm of sulfur.

4. An emissions control system as described in claim 1, wherein the manganese compound is an organometallic compound.

5. An emissions control system as described in claim 4, wherein the organometallic compound is selected from the group consisting of alcohols, aldehydes, ketones, esters, anhydrides, hydroxides, sulfonates, phosphonates, chelates, phenates, crown ethers, carboxylic acids, amides, acetyl acetonates and mixtures thereof.

6. An emissions control system as described in claim 4, wherein the organometallic compound comprises methylcyclopentadienyl manganese tricarbonyl.

7. An emissions control system as described in claim 1, wherein the manganese compound is selected from the following group: cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and mixtures of two or more such compounds.

8. An emissions control system as described in claim 1, wherein the combustion byproduct is selected from the group consisting of particulates, soot, unburned soot, uncombusted hydrocarbons, partially-combusted hydrocarbons, combusted hydrocarbons, and oxides of nitrogen.

9. An emissions control system as described in claim 1, further comprising a lean-$NO_x$ storage device located within the exhaust passageway, the lean-$NO_x$ storage device contacting the exhaust stream.

10. An emissions control system including the treatment of a diesel fuel combustion process exhaust stream, comprising:
    an exhaust passageway,
    an exhaust stream in the exhaust passageway, the exhaust stream containing exhaust byproducts from the combustion of a diesel fuel and also comprising a manganese compound comprising about 1 to about 30 mg Mn/liter of fuel,
    a continuously regenerating technology diesel particulate filter located within the exhaust passageway, the continuously regenerating technology diesel particulate filter contacting the exhaust stream,
    the exhaust stream comprising the manganese compound, the manganese compound complexing with at least one of the exhaust byproducts in the exhaust stream, the operation of the continuously regenerating technology diesel particulate filter enhanced by the manganese compound complexing with at least one of the exhaust byproducts in the exhaust stream, and
    the exhaust stream being free of a platinum group metal selected from the group consisting of platinum, palladium, rhodium, ruthenium, osmium, and iridium.

11. An emissions control system as described in claim 10, wherein the diesel fuel is selected from the group consisting of biodiesel, biodiesel-derived fuel, and synthetic diesel fuel.

12. An emissions control system as described in claim 10, wherein the diesel fuel contains less than 20 ppm of sulfur.

13. An emissions control system as described in claim 10, wherein the manganese compound is an organometallic compound.

14. An emissions control system as described in claim 13, wherein the organometallic compound is selected from the group consisting of alcohols, aldehydes, ketones, esters, anhydrides, hydroxides, sulfonates, phosphonates, chelates, phenates, crown ethers, carboxylic acids, amides, acetyl acetonates and mixtures thereof.

15. An emissions control system as described in claim 13, wherein the manganese compound comprises methylcyclopentadienyl manganese tricarbonyl.

16. An emissions control system as described in claim 10, wherein the manganese compound is selected from the following group: cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and mixtures of two or more such compounds.

17. An emissions control system as described in claim 10, wherein the combustion byproduct is selected from the group consisting of particulates, soot, unburned soot, uncombusted hydrocarbons, partially-combusted hydrocarbons, combusted hydrocarbons, and oxides of nitrogen.

18. An emissions control system as described in claim 10, further comprising a lean-$NO_x$ storage device located within the exhaust passageway, the lean-$NO_x$ storage device contacting the exhaust stream.

19. An emissions control system including the treatment of a diesel fuel combustion process exhaust stream comprising:
   an exhaust passageway,
   an exhaust stream in the exhaust passageway, the exhaust stream containing exhaust byproducts from the combustion of a diesel fuel,
   a catalyzed diesel particulate filter located within the exhaust passageway, the catalyzed diesel particulate filter contacting the exhaust stream,
   an additive introduced into the exhaust stream, the additive comprising a manganese compound comprising about 1 to about 30 mg Mn/liter of fuel, the manganese compound complexing with at least one of the exhaust byproducts, the operation of the catalyzed diesel particulate filter enhanced by the manganese compound complexing with at least one of the exhaust byproducts in the exhaust stream, and
   the additive being free of a platinum group metal selected from the group consisting of platinum, palladium, rhodium, ruthenium, osmium, and iridium.

20. An emissions control system as described in claim 19, wherein the diesel fuel is selected from the group consisting of biodiesel, biodiesel-derived fuel, and synthetic diesel fuel.

21. An emissions control system as described in claim 19, wherein the diesel fuel contains less than 30 ppm of sulfur.

22. An emissions control system as described in claim 19, wherein the manganese compound is an organometallic compound.

23. An emissions control system as described in claim 22, wherein the organometallic compound is selected from the group consisting of alcohols, aldehydes, ketones, esters, anhydrides, hydroxides, sulfonates, phosphonates, chelates, phenates, crown ethers, carboxylic acids, amides, acetyl acetonates and mixtures thereof.

24. An emissions control system as described in claim 22, wherein the organometallic compound comprises methylcyclopentadienyl manganese tricarbonyl.

25. An emissions control system as described in claim 19, wherein the manganese compound is selected from the following group: cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and mixtures of two or more such compounds.

26. An emissions control system as described in claim 19, wherein the combustion byproduct is selected from the group consisting of particulates, soot, unburned soot, uncombusted hydrocarbons, partially-combusted hydrocarbons, combusted hydrocarbons, and oxides of nitrogen.

27. An emissions control system as described in claim 19, further comprising a lean-$NO_x$ storage device located within the exhaust passageway, the lean-$NO_x$ storage device contacting the exhaust stream.

28. An emissions control system including the treatment of a diesel fuel combustion process exhaust stream comprising:
   an exhaust passageway,
   an exhaust stream in the exhaust passageway, the exhaust stream containing exhaust byproducts from the combustion of a diesel fuel,
   a continuously regenerating technology diesel particulate filter located within the exhaust passageway, the continuously regenerating diesel particulate filter contacting the exhaust stream,
   an additive introduced into the exhaust stream, the additive comprising a manganese compound comprising about 1 to about 30 mg Mn/liter of fuel, the manganese compound complexing with at least one of the exhaust byproducts, the operation of the continuously regenerated technology diesel particulate filter enhanced by the manganese compound complexing with at least one of the exhaust byproducts in the exhaust stream, and
   the additive being free of a platinum group metal selected from the group consisting of platinum, palladium, rhodium, ruthenium, osmium, and iridium.

29. An emissions control system as described in claim 28, wherein the diesel fuel is selected from the group consisting of biodiesel, biodiesel-derived fuel, and synthetic diesel fuel.

30. An emissions control systems as described in claim 28, wherein the diesel fuel contains less than 30 ppm of sulfur.

31. An emissions control system as described in claim 28, wherein the manganese compound is an organometallic compound.

32. An emissions control system as described in claim 31, wherein the organometallic compound is selected from the group consisting of alcohols, aldehydes, ketones, esters, anhydrides, hydroxides, sulfonates, phosphonates, chelates, phenates, crown ethers, carboxylic acids, amides, acetyl acetonates and mixtures thereof.

33. An emissions control system as described in claim 31, wherein the organometallic compound comprises methylcyclopentadienyl manganese tricarbonyl.

34. An emissions control system as described in claim 28, wherein the manganese compound is selected from the following group: cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and mixtures of two or more such compounds.

35. An emissions control system as described in claim 28, wherein the combustion byproduct is selected from the group consisting of particulates, soot, unburned soot, uncombusted hydrocarbons, partially-combusted hydrocarbons, combusted hydrocarbons, and oxides of nitrogen.

36. An emissions control system as described in claim 28, further comprising a lean-$NO_x$ storage device located within the exhaust passageway, the lean-$NO_x$ storage device contacting the exhaust stream.

37. An emissions control system including the treatment of a fuel combustion process exhaust stream, comprising:
   an exhaust passageway, an exhaust stream in the exhaust passageway containing exhaust byproducts from the combustion of a fuel comprising a manganese compound comprising about 1 to about 30 mg Mn/liter of fuel, the fuel is selected from the group consisting of gasoline, bunker fuel, coal dust, crude oil, refinery "bottoms" and by-products thereof, crude oil extracts, hazardous wastes, yard trimmings and waste, wood chips and saw dust, agricultural waste or tillage, plastics and other organic waste and by-products, and mixtures thereof, and emulsions, suspensions, and dispersions thereof in water, alcohol, or other carrier fluids, the exhaust stream comprising the manganese compound, the manganese compound complexing with at least one of the exhaust byproducts in the exhaust stream, the operation of the emissions after treatment system enhanced by the manganese compound complexing with at least one of the exhaust byproducts in the exhaust stream by at least one of the following:

reduction in the impact of poisons on the emissions after treatment system, reduction in the rate of soot accumulation, and reduction in the temperature at which the soot is oxidized in the emissions after treatment system.

38. The system of claim 37, wherein the fuel comprises gasoline.

39. The system of claim 37, wherein the fuel comprises bunker fuel.

40. The system of claim 37, wherein the fuel comprises coal dust.

41. The system of claim 37, wherein the fuel comprises crude oil.

42. The system of claim 37, wherein the fuel comprises agricultural waste.

43. The system of claim 37, wherein the fuel comprises hazardous waste.

44. The system of claim 37, wherein the fuel comprises organic waste.

45. The system of claim 37, wherein the fuel comprises refinery bottoms.

46. An emissions control system including the treatment of a fuel combustion process exhaust stream comprising:

an exhaust passageway, an exhaust stream in the exhaust passageway containing exhaust byproducts from the combustion of a fuel, the fuel is selected from the group consisting of gasoline, bunker fuel, coal dust, crude oil, refinery "bottoms" and by-products thereof, crude oil extracts, hazardous wastes, yard trimmings and waste, wood chips and saw dust, agricultural waste or tillage, plastics and other organic waste and by-products, and mixtures thereof, and emulsions, suspensions, and dispersions thereof in water, alcohol, or other carrier fluids, an additive introduced into the exhaust stream, the additive comprising a manganese compound comprising about 1 to about 30 mg Mn/liter of fuel, the manganese compound complexing with at least one of the exhaust byproducts, the operation of the emissions after treatment system enhanced by the manganese compound complexing with at least one of the exhaust byproducts in the exhaust stream by at least one of the following:

reduction in the impact of poisons on the emissions after treatment system, reduction in the rate of soot accumulation, and reduction in the temperature at which the soot is oxidized in the emissions after treatment system.

47. The system of claim 46, wherein the fuel comprises gasoline.

48. The system of claim 46, wherein the fuel comprises bunker fuel.

49. The system of claim 46, wherein the fuel comprises coal dust.

50. The system of claim 46, wherein the fuel comprises crude oil.

51. The system of claim 46, wherein the fuel comprises agricultural waste.

52. The system of claim 46, wherein the fuel comprises hazardous waste.

53. The system of claim 46, wherein the fuel comprises organic waste.

54. The system of claim 46, wherein the fuel comprises refinery bottoms.

* * * * *